(12) United States Patent
Kawamura et al.

(10) Patent No.: US 8,037,403 B2
(45) Date of Patent: Oct. 11, 2011

(54) APPARATUS, METHOD, AND COMPUTER PROGRAM PRODUCT FOR EXTRACTING STRUCTURED DOCUMENT

(75) Inventors: Takahiro Kawamura, Tokyo (JP);
Masumi Inaba, Kanagawa (JP);
Shinichi Nagano, Kanagawa (JP);
Tetsuo Hasegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 946 days.

(21) Appl. No.: 11/622,216

(22) Filed: Jan. 11, 2007

(65) Prior Publication Data

US 2007/0179937 A1 Aug. 2, 2007

(30) Foreign Application Priority Data

Jan. 13, 2006 (JP) .................................. 2006-006443

(51) Int. Cl.
*G06F 17/30* (2006.01)

(52) U.S. Cl. .......... 715/234; 707/999.003; 707/999.006; 707/E17.095; 707/E17.122

(58) Field of Classification Search .................. 715/234, 715/241, 254; 707/999.003, 999.006, E17.095, 707/E17.122
See application file for complete search history.

(56) References Cited

U.S. PATENT DOCUMENTS

| | | | | |
|---|---|---|---|---|
| 5,907,836 | A * | 5/1999 | Sumita et al. | 707/2 |
| 6,314,420 | B1 * | 11/2001 | Lang et al. | 707/3 |
| 6,622,139 | B1 * | 9/2003 | Nakayama et al. | 707/3 |
| 7,293,019 | B2 * | 11/2007 | Dumais et al. | 707/5 |
| 7,331,517 | B2 * | 2/2008 | Inakoshi et al. | 235/380 |
| 7,529,735 | B2 * | 5/2009 | Zhang et al. | 1/1 |
| 2003/0033333 | A1 * | 2/2003 | Nishino et al. | 707/531 |
| 2003/0074350 | A1 * | 4/2003 | Tsuda | 707/3 |
| 2003/0120640 | A1 * | 6/2003 | Ohta et al. | 707/3 |
| 2006/0004691 | A1 | 1/2006 | Sifry | |
| 2006/0277168 | A1 * | 12/2006 | Hammond et al. | 707/3 |
| 2007/0061487 | A1 * | 3/2007 | Moore et al. | 709/246 |

FOREIGN PATENT DOCUMENTS

| | | |
|---|---|---|
| JP | 08-288960 | 11/1996 |
| JP | 2005-182803 | 7/2005 |
| JP | 2005-309964 | 11/2005 |
| JP | 2005-352861 | 12/2005 |
| JP | 2008-508575 | 3/2008 |
| WO | 03/046764 | 6/2003 |

OTHER PUBLICATIONS

Japanese Decision of Rejection for 2006-006443 mailed on Jan. 19, 2010.

(Continued)

*Primary Examiner* — Stephen Hong
*Assistant Examiner* — Ahamed Nazar
(74) *Attorney, Agent, or Firm* — Turocy & Watson, LLP

(57) ABSTRACT

An apparatus for retrieving a structured document including a first specifying unit that specifies a plurality of object documents from a plurality of structured documents being accessible via a network, the object document being the structured document according to retrieval condition; a first extracting unit that extracts text included in the object document; a second extracting unit that extracts metadata appended to the object document, the metadata being first data concerning the text of the object document and second data indicating a link relation between the object document and the structured documents; and a first calculating unit that calculates importance of each of the object documents, based on the text and the metadata of each of the object documents.

19 Claims, 11 Drawing Sheets

OTHER PUBLICATIONS

Decision of a Patent Grant for 2006-006443 mailed on Jun. 1, 2010.
Nakajima, et al. Web Information Filtering based on Blog Trust, IPSJ SIG Technical Report, 2004, pp. 699-705.

Kitayama, et al. Extraction of Evaluation and Blog Search using News Video Scene Order, DBSJ Letters vol. 4, No. 1.
Chronoscape Ltd. Yahoo! blog, 2005.

* cited by examiner

| ATTRIBUTE | AUTHOR INFORMATION |
|---|---|
| HDD | B, C, ... |
| | |

FIG.7

| TITLE | MINERAL WATER |
|---|---|
| AUTHOR | AAA |
| DATE OF CREATION | 2005/12/2 20:20 |
| SUMMARY | SUMMARY |
| ⋮ | ⋮ |
| TEXT | MENERAL WATER IS ...... |
| COMMENT | OUR MINERAL WATER IS ...... |
| TRACK-BACK·PING | http ... |

US 8,037,403 B2

APPARATUS, METHOD, AND COMPUTER PROGRAM PRODUCT FOR EXTRACTING STRUCTURED DOCUMENT

CROSS-REFERENCE TO RELATED APPLICATIONS

This application is based upon and claims the benefit of priority from the prior Japanese Patent Application No. 2006-6443, filed on Jan. 13, 2006; the entire contents of which are incorporated herein by reference.

BACKGROUND OF THE INVENTION

1. Field of the Invention

The present invention relates to an apparatus, method and computer program product for extracting a structured document accessible via a network.

2. Description of the Related Art

Conventionally, technologies for judgment on positive or negative (p/n) of a document present on a Web and extraction of a hot topic from the document are known. For example, in "Main Topic Extraction in a Blog Space", a study group material of the Japan Society of Artificial Intelligence SIG-KBS-A501-02, pp. 5-10, 2005, Kazumi Saito and three others, a technology for obtaining a large-scale document stream from blogs, electronic mails, news, and the like on the Internet is disclosed. Further, for example, in JP-A 2005-182803 (KO-KAI), a technology for generating an information digest by extracting predetermined information from a document is disclosed.

In the conventional document extraction, object sentences are often corpuses prepared in advance. A situation in which a user encounters various opinions while browsing the Web is not assumed. However, actually, it is considered that, for example, in opinions in a blog, opinions attached with approvals by a large number of track-backs and opinions attached with no track-back affect psychology of users differently.

Moreover, it is considered that, even if a large number of links are attached to opinions, the opinions affects psychology of users differently depending on time when the links are attached, for example, one year ago or today. Provision of a document extraction technology taking into account such information is desired.

SUMMARY OF THE INVENTION

According to an aspect of the present invention, an apparatus for retrieving a structured document extracting includes a first specifying unit that specifies a plurality of object documents from a plurality of structured documents being accessible via a network, the object document being the structured document according to retrieval condition; a first extracting unit that extracts text included in the object document; a second extracting unit that extracts metadata appended to the object document, the metadata being first data concerning the text of the object document and second data indicating a link relation between the object document and the structured documents; and a first calculating unit that calculates importance of each of the object documents, based on the text and the metadata of each of the object documents.

According to another aspect of the present invention, a method of retrieving a structured document that is accessible via a network includes specifying a plurality of object documents from a plurality of structured documents, the object document being the structured document according to retrieval condition; extracting text included in the object document; extracting metadata appended to the object document, the metadata being first data concerning the text of the object document and second data indicating a link relation between the object document and the structured documents; and calculating importance of each of the object documents, based on the text and the metadata of each of the object documents.

According to still another aspect of the present invention, a computer program product that is executable by a computer and has a computer-readable recording medium including a plurality of commands for retrieving a structured document, wherein the commands cause the computer to execute specifying a plurality of object documents from a plurality of structured documents, the object document being the structured document according to retrieval condition; extracting text included in the object document; extracting metadata appended to the object document, the metadata being first data concerning the text of the object document and second data indicating a link relation between the object document and the structured documents; and calculating importance of each of the object documents, based on the text and the metadata of each of the object documents.

BRIEF DESCRIPTION OF THE DRAWINGS

FIG. 7 is a diagram of an example of a description of the structured document shown in FIG. 6;

DETAILED DESCRIPTION OF THE INVENTION

Exemplary embodiments of the present invention are explained in detail below with reference to the drawings.

Figure 1:
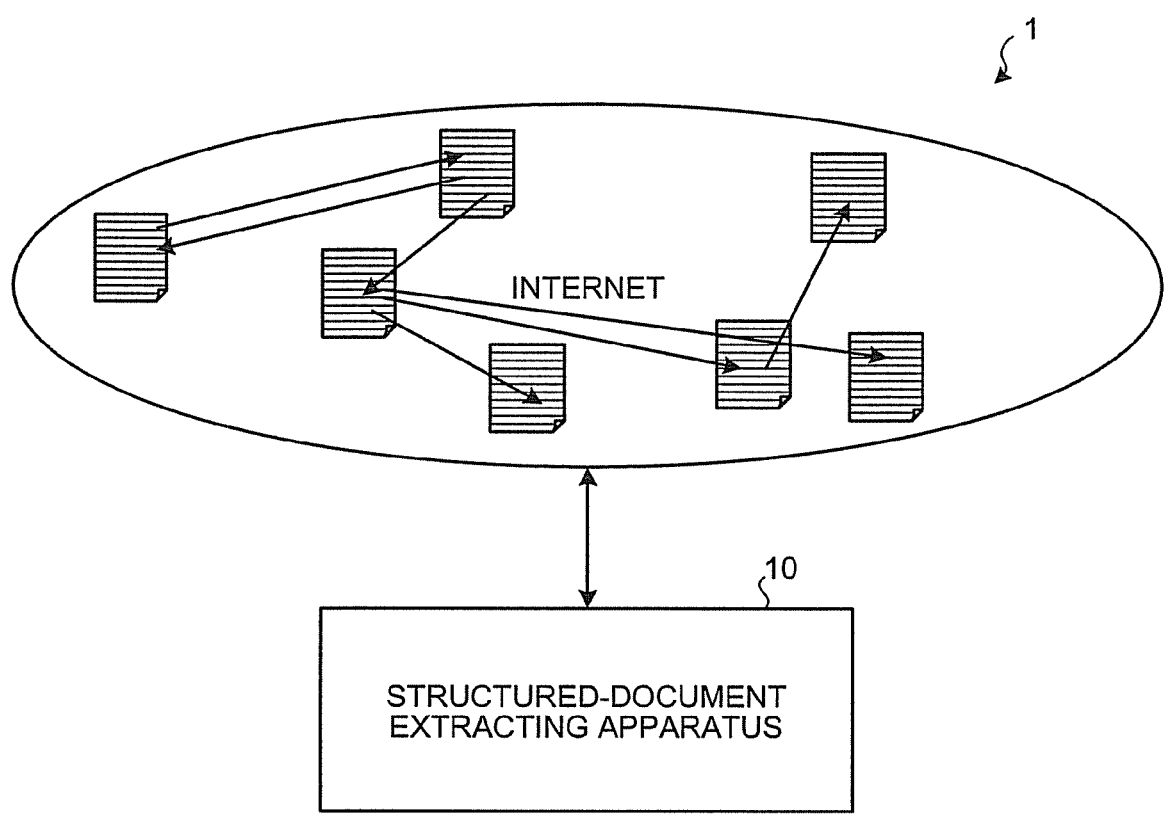
FIG. 1 is a diagram of an overall structure of a structured-document extracting system including a structured-document extracting apparatus.

As shown in FIG. 1, a structured-document extracting system 1 includes a structured-document extracting apparatus 10. The structured-document extracting apparatus 10 extracts structured documents matching retrieval conditions designated by a user, that is, object documents, out of structured documents on a network such as the Internet, sorts the object documents in order from one with highest importance, and provides the user with the object documents. As an example of the structured documents, a blog described in the XML is explained.

Figure 2:
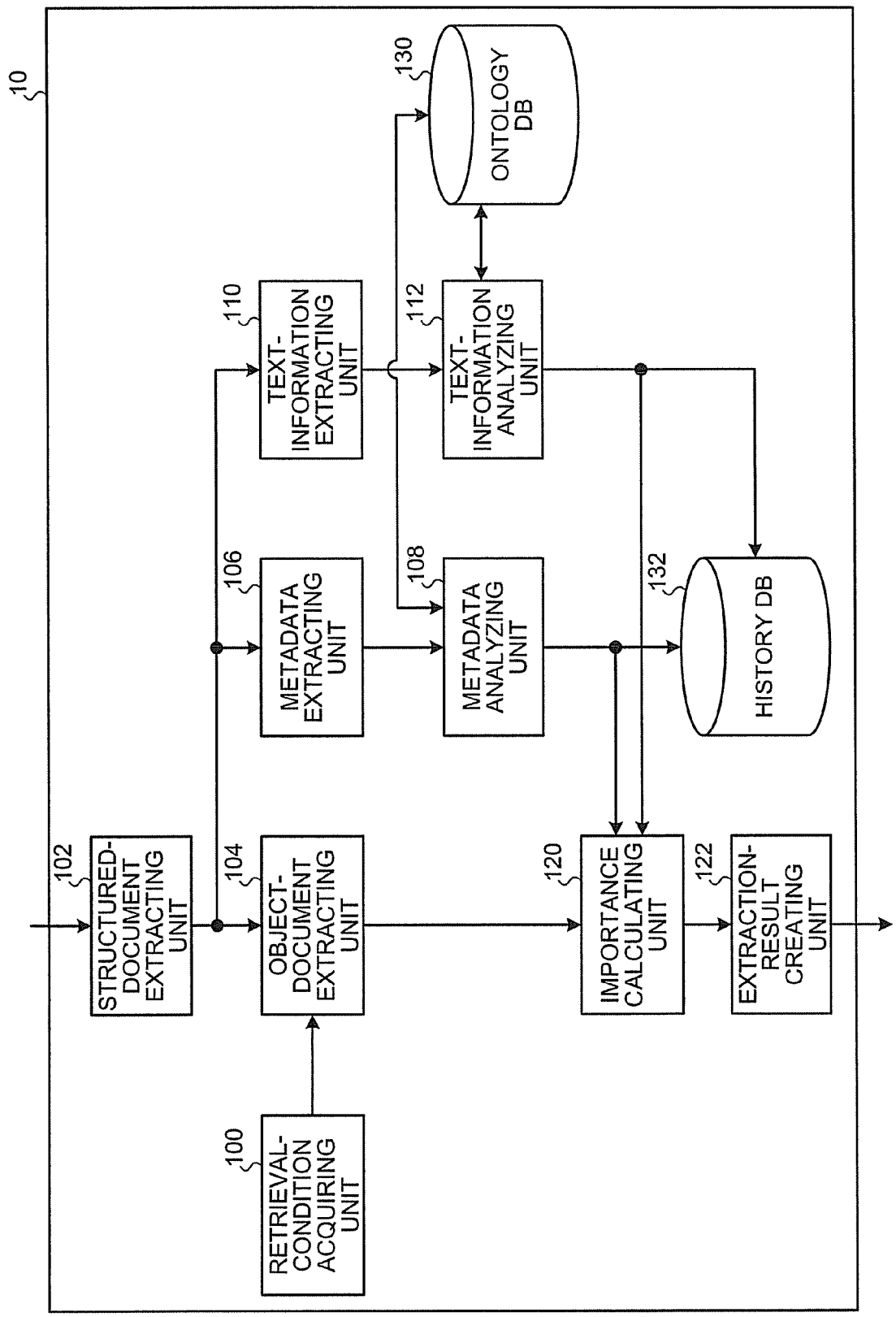
FIG. 2 is a block diagram of a functional structure of the structured-document extracting apparatus.

As shown in FIG. 2, the structured-document extracting apparatus 10 includes a retrieval-condition acquiring unit 100, a structured-document extracting unit 102, an object-document extracting unit 104, a metadata extracting unit 106, a metadata analyzing unit 108, a text-information extracting unit 110, a text-information analyzing unit 112, an importance calculating unit 120, an extraction-result creating unit 122, an ontology database (DB) 130, and a history DB 132.

The retrieval-condition acquiring unit 100 acquires retrieval conditions from the user via an input/output device. The structured-document extracting unit 102 acquires structured documents via the Internet. The object-document extracting unit 104 extracts object documents matching the retrieval conditions acquired by the retrieval-condition acquiring unit 100 out of the structured documents acquired by the structured-document extracting unit 102.

Figures 3, 4:
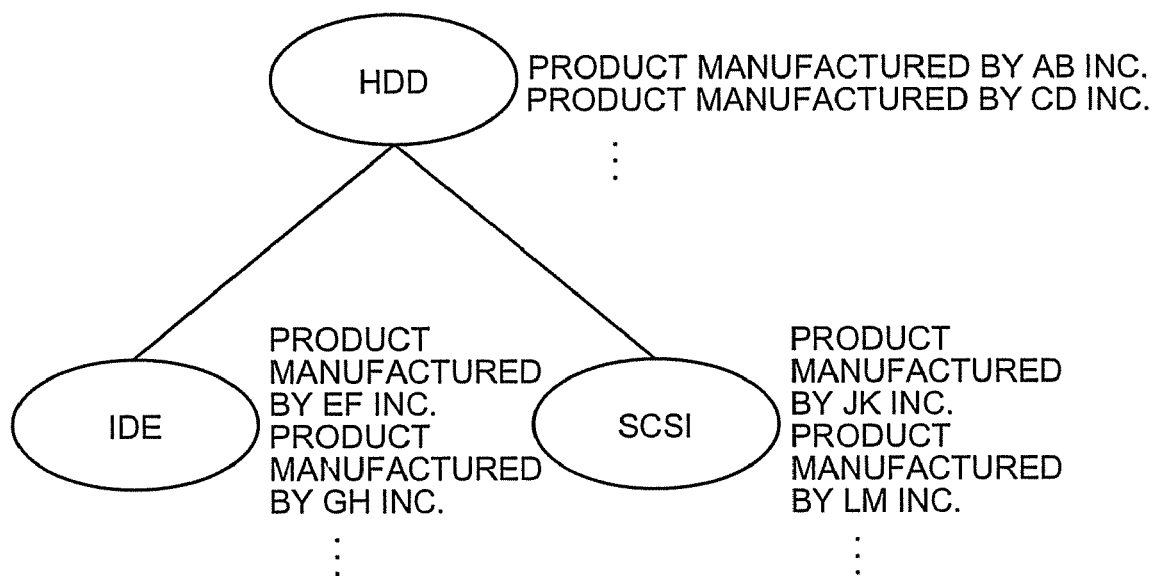
FIG. 3 is a diagram of an example of information held by an ontology DB.
FIG. 4 is a table of an example of information held by a history DB.

The ontology DB 130 holds information that the structured-document extracting apparatus 10 uses. As shown in FIG. 3, the ontology DB 130 stores a plurality of concepts. The ontology DB 130 holds a link relation among the respective concepts. In the example shown in FIG. 3, three concepts, namely, an HDD, an IDE, and an SCSI, are stored. Both the IDE and the SCSI are concepts included in the HDD. It is possible to specify a mutual relation such as an inclusion relation among the respective concepts based on this link relation.

Moreover, instances (specific names) are associated with the respective concepts. For example, instances such as a product manufactured by AB Inc. and a product manufactured by CD Inc. are associated with the HDD. By using this link relation, for example, from the link relation of the SCSI with which a product manufactured by JK Inc. is associated, it is possible to specify that a product manufactured by JK Inc. is also an instance of the HDD although a product manufactured by JK Inc. is not associated with the HDD.

The metadata extracting unit 106 extracts metadata from the structured documents acquired by the structured-document extracting unit 102. In other words, the metadata extracting unit 106 extracts metadata from each of the object documents and the structured documents other than the object documents.

The metadata is information appended to the structured documents and is information for explaining information included in the structured documents as a text. The text is main part of the structured document and does not included a note and a picture. Specifically, the metadata is information for explaining content of a site or an article. The metadata is described later.

The metadata analyzing unit 108 analyzes the metadata. Specifically, the metadata analyzing unit 108 specifies predetermined data from the metadata. In specifying the predetermined data, the metadata analyzing unit 108 appropriately uses the information stored in the ontology DB 130.

The text-information extracting unit 110 extracts text from the structured documents acquired by the structured-document extracting unit 102. In other words, the text-information extracting unit 110 extracts text from each of the object documents and the structured documents other than the object documents. The text is described later.

The text analyzing unit 112 analyzes the text. Specifically, the text-information analyzing unit 112 specifies predetermined content from the text. In specifying the predetermined content, the text-information analyzing unit 112 appropriately uses the information stored in the ontology DB 130.

The history DB 132 holds results of the analyses by the metadata analyzing unit 108 and the text-information analyzing unit 112. In other words, the history DB 132 holds results of the analyses used for predetermined retrieval conditions in association with analysis dates and times. Moreover, the history DB 132 holds information obtained from the results of the analyses.

As shown in FIG. 4, the history DB 132 holds, for example, attributes and author information in association with each other. For example, when an author of a plurality of structured documents corresponding to a predetermined attribute is B and a large number of structured documents are linked to the structured documents, the history DB 132 holds author information of the author B and this attribute in association with each other.

A structured document linked to a large number of structured documents is often a document supported by many users. Since the history DB 132 holds author information of such a document, it is possible to specify the document supported by many users from the author information.

The importance calculating unit 120 calculates importance of the respective object documents extracted by the object-document extracting unit 104. Moreover, the importance calculating unit 120 calculates importance of respective comments made with respect to the object documents. In calculating the importance, the importance calculating unit 120 uses the result of the analysis by the metadata analyzing unit 108 and the result of the analysis by the text-information analyzing unit 112.

Figure 5:
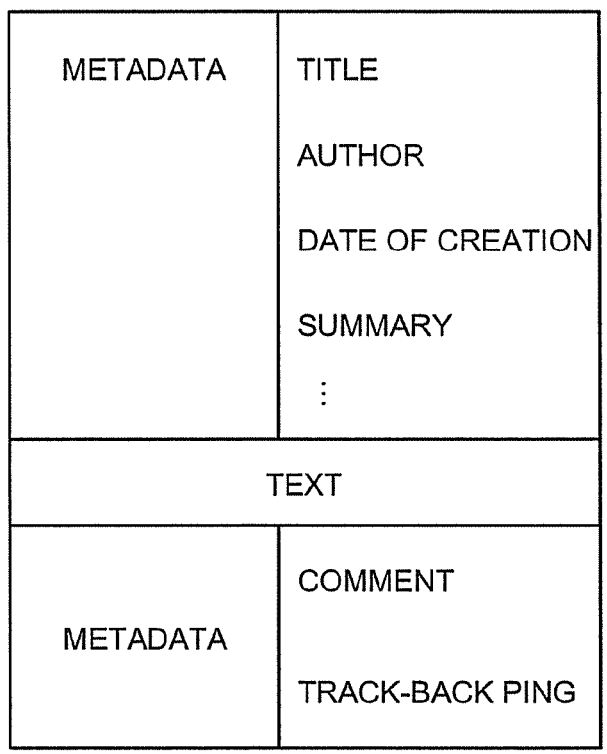
FIG. 5 is a diagram for explaining a data structure of a structured document.

As shown in FIG. 5, a structured document includes a text and metadata appended to the text. The metadata includes a plurality of pieces of information. The text and the respective pieces of information of the metadata are identified by tags. Text is, for example, content created by an author of the structured document such as a news article and a text of a blog.

The metadata also includes a title, an author, a date of creation, a summary, and the like of the text. Moreover, the metadata includes comments such as opinions of other authors contributed to the text, authors of the comments, and dates of writing of the comments. Specifically, such information included in the metadata is included in an RDF Site Summary (RSS).

The metadata also includes information indicating a link relation between the structured document and other structured documents. For example, when the structured document is linked from the other structured documents, the metadata includes information indicating to that effect and information for accessing the other structured documents. Specifically, such information is included as information of a track-back ping.

Figure 6:
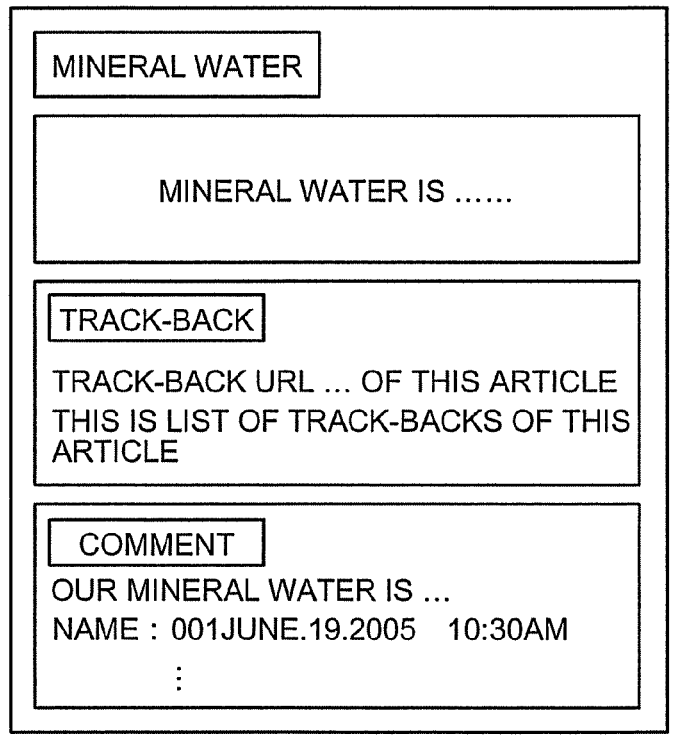
FIG. 6 is a diagram of an example of display of a structured document.

In a structured document shown in FIG. 6, a text "mineral water is . . . " is included under a title "mineral water". A track-back and a comment are appended to the text.

In an example of description in FIG. 7, content of the text shown in FIG. 6 is described as a text. A title is described in metadata. An author and a date of creation of the text are described in the metadata. Specifically, these pieces of information included in the metadata are described in an RSS. A comment and a track-back are appended to the text as metadata.

Figure 8:
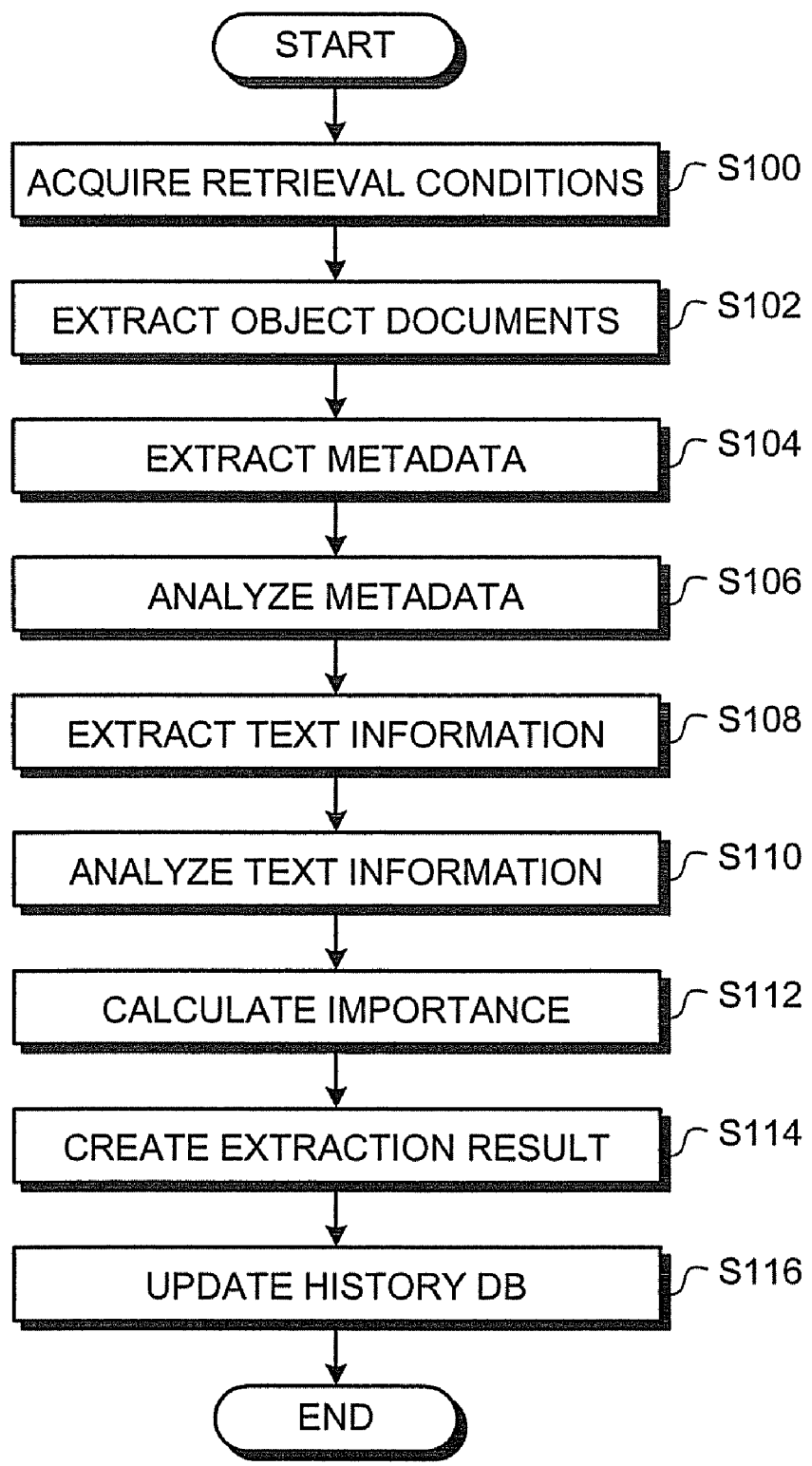
FIG. 8 is a flowchart of structured-document extraction processing by the structured-document extracting apparatus.

As shown in FIG. 8, in structured-document extracting processing, first, the retrieval-condition acquiring unit 100 of the structured-document extracting apparatus 10 acquires retrieval conditions (step S100). The object-document extracting unit 104 extracts object documents according to the retrieval conditions (step S102). The metadata extracting unit 106 extracts metadata of respective structured documents acquired by the structured-document extracting unit 102 (step S104). The metadata analyzing unit 108 analyzes the metadata extracted by the metadata extracting unit 106 (step S106).

The text-information extracting unit 110 extracts text of the respective structured documents acquired by the structured-document extracting unit 102 (step S108). The text-information analyzing unit 112 analyzes the metadata extracted by the text-information extracting unit 110 (step s110).

The importance calculating unit 120 calculates importance of the respective object documents based on a result of the analysis by the metadata analyzing unit 108, a result of the analysis by the text-information analyzing unit 112, and the information held by the history DB 132 (step S112). The extraction-result creating unit 122 creates an extraction result based on the importance calculated by the importance calculating unit 120 (step S114).

The structured-document extracting apparatus 10 updates the information held by the history DB 132 based on the result of the analysis by the metadata analyzing unit 108 and the result of the analysis by the text-information analyzing unit 112 (step S116). The structured-document extraction processing by the structured-document extracting apparatus 10 is completed.

An order of steps S104 and S106 and steps S108 and S110 is not limited to this example. For example, steps S108 and S110 may be performed before steps S104 and S106.

In importance calculation processing, the metadata analyzing unit 108 specifies, based on an RSS, whether author information of related documents linked to object documents by the track-back ping is given to the related documents as link information. The importance calculating unit 120 calculates importance of the object documents based on presence or absence of the author information of the related documents.

Figure 9:
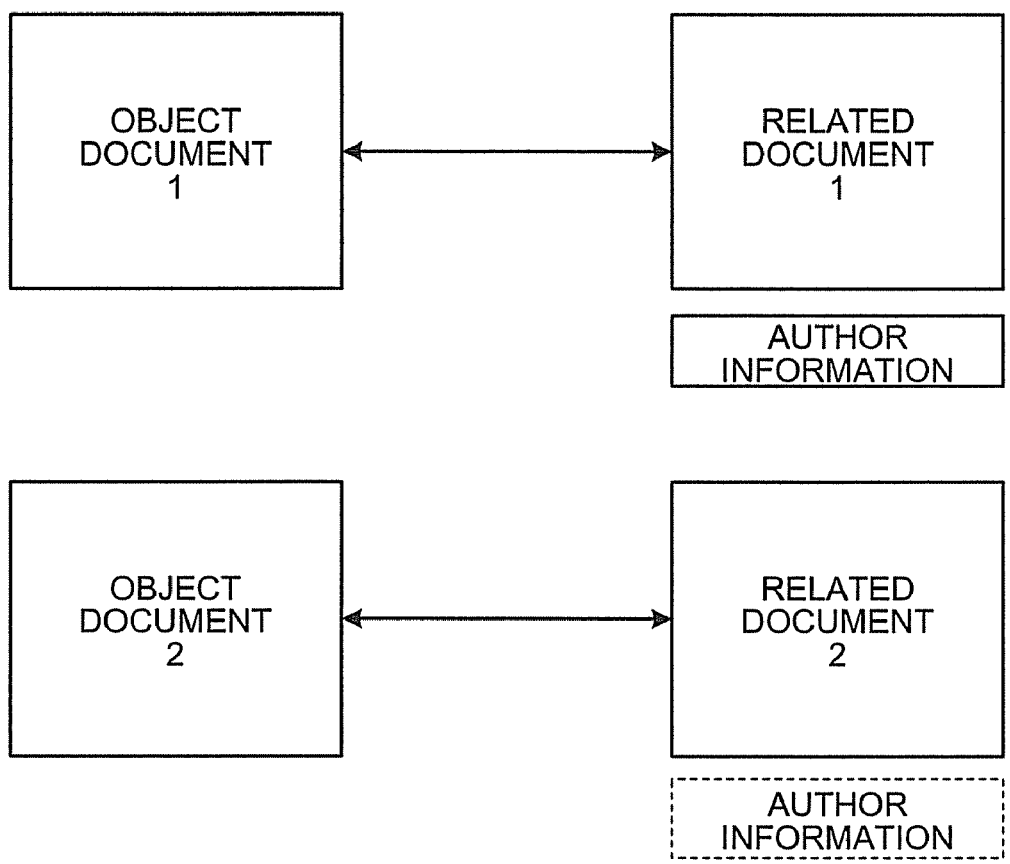
FIG. 9 is a diagram for explaining importance calculation processing.

In the example shown in FIG. 9, a related document 1 and a related document 2 are linked to an object document 1 and an object document 2, respectively. However, author information is not appended to the related document 2 as link information. In this case, the importance calculating unit 120 calculates importance, which is high compared with importance of the object document 2, for the object document 1. In this way, it is possible to set importance of a more appropriate object document high by setting high importance for an object document to which a related document, an author of which is made public, is linked.

The metadata analyzing unit 108 specifies, from an RSS, dates of creation of the related documents linked to the object documents by the track-back ping. As a date of creation of a related document is later, the importance calculating unit 120 calculates higher importance.

Figure 10:
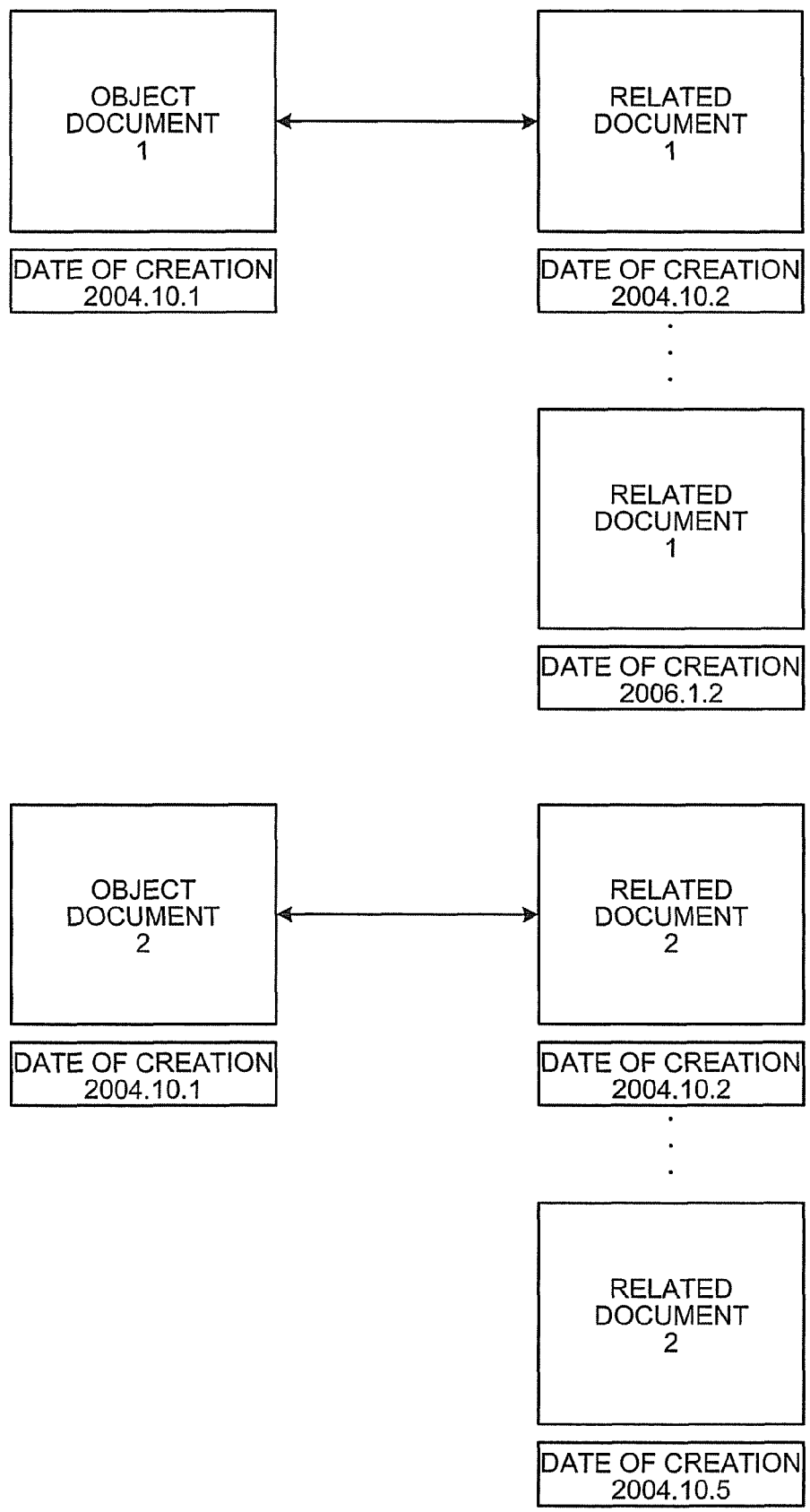
FIG. 10 is a diagram for explaining importance calculation processing.

However, as in the example shown in FIG. 10, even when a date of creation of an object document is early, when a date of creation of a related document linked to the object document is relatively late, importance of the object document is set high because the related document is referred to for a long period.

For example, in the example shown in FIG. 10, dates of creation of an object document 1 and an object document 2 are identical. However, both related documents 2 of the object document 2 are created in October 2004 and related documents created after October 2004 are not linked to the object document 2. On the other hand, related documents 1 of the object document 1 are periodically linked from October 2004 to January 2006. In this case, importance, which is high compared with importance of the object document 2, is calculated for the object document 1.

As another example, the metadata analyzing unit 108 further specifies dates of creation of the object documents from an RSS. The importance calculating unit 120 may calculate higher importance as a period between a date of creation of an object document and a date of creation of a related document is longer.

When there are a large number of pieces of related information created within a predetermined period such as one day or one hour from the date of creation of an object document, it is highly likely that content of the object document is content discussed in depth and is hot content. Thus, the number of related documents created within the predetermined period is equal to or larger than a defined number set in advance, the importance calculating unit 120 calculates importance, which is higher compared with importance calculated when the number of related documents is less than the defined number. Consequently, it is possible to calculate higher importance for hot content. The defined number may be an absolute value or may be a value relative to the number of all related documents.

The metadata analyzing unit 108 specifies a comment on text from an RSS. The importance calculating unit 120 calculates importance of the object document based on the number of comments from different authors.

Specifically, first, the importance calculating unit 120 specifies a comment on a text and an author of the text based on an RSS appended to the object document. The importance calculating unit 120 counts the number of comments from difference authors. Since an object document having a large number of comments is a document that has a major repercussion from users, importance, which is high compared with importance of the other object documents, is calculated for the object document.

Figure 11:
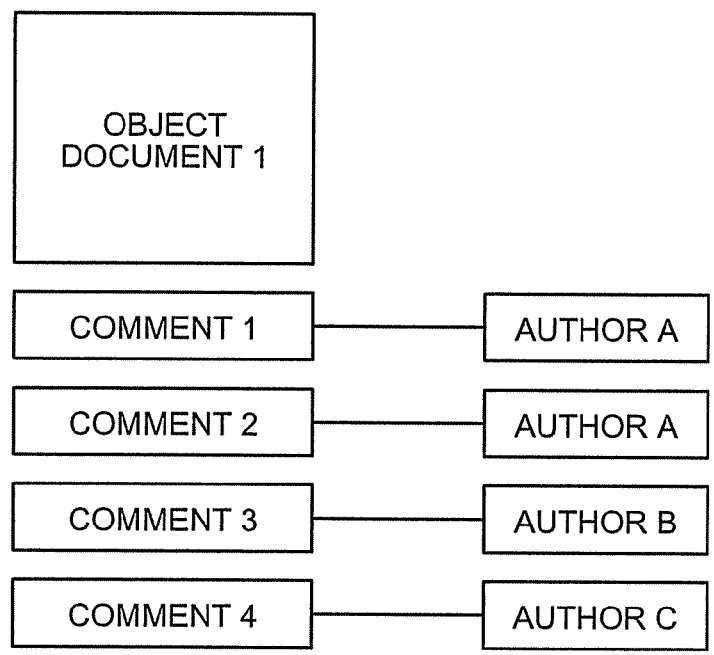
FIG. 11 is a diagram for explaining importance calculation processing.

For example, in the example shown in FIG. 11, four comments, a comment 1 to a comment 4, are made with respect to an object document 1. The comment 1 and the comment 2 are written by an identical author. Therefore, the number of comments written by different authors for the object document 1 is three.

The metadata analyzing unit 108 specifies a date of creation of an object document based on the RSS appended to the object document. The metadata analyzing unit 108 further specifies dates of writing of the comments on the text of the object document. The importance calculating unit 120 specifies importance of the object data based on the date of creation of the object document and the dates of writing of the comments.

Specifically, the importance calculating unit 120 judges that an object document to which comments are periodically made regardless of the fact that a date of creation thereof is early is a document that has been attracting the interest for a long period. The importance calculating unit 120 calculates importance, which is high compared with importance of an object document to which recent comments are not made, for the object document.

For example, the importance calculating unit 120 calculates a value obtained by dividing the number of comments made with respect to the object document by a period from a date of writing of the oldest comment to a date of writing of a newest comment. As a value obtained as a result of the calculation is larger, the importance calculating unit 120 calculates higher importance for the object document. Consequently, the importance calculating unit 120 can calculate more appropriate importance.

The importance calculating unit 120 calculates importance based on whether information indicating a link relation with the other structured documents is included in the object document. Specifically, the importance calculating unit 120 calculates importance, which is low compared with importance of an object document including the information indicating the link relation with the other structured document, for an object document to which a track-back ping indicating the link relation with the other structured documents is not appended.

Figure 12:
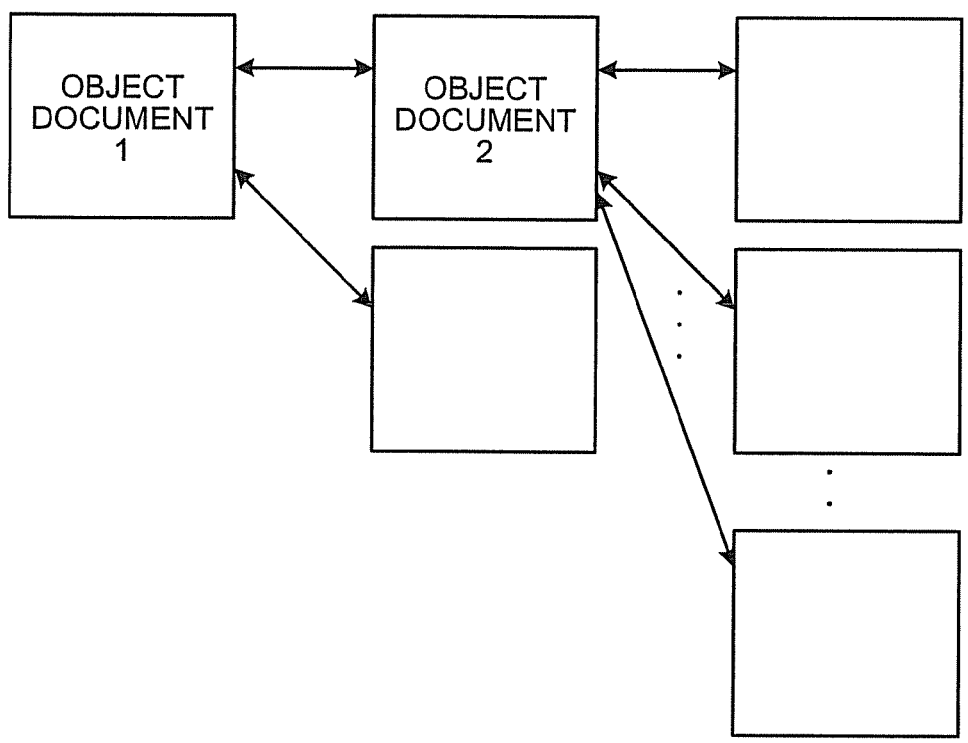
FIG. 12 is a diagram for explaining importance calculation processing.

As indicated by the example shown in FIG. 12, it is assumed that a plurality of structured documents including a second object document is associated with a first object data in metadata of the first object document and a plurality of structured documents are associated with the second object document in the metadata of the second object document. When the number of structured documents associated with the second object document is larger than the number of structured documents associated with the first object document, the importance calculating unit 120 calculates importance, which is high compared with importance of the first object document, for the second object document. This is because, in such a case, it is considered that the second object document is the center of topics.

The metadata analyzing unit 108 specifies an author of the object document from the RSS appended to the object document. The importance calculating unit 120 calculates importance based on the author of the object document.

Figure 13:
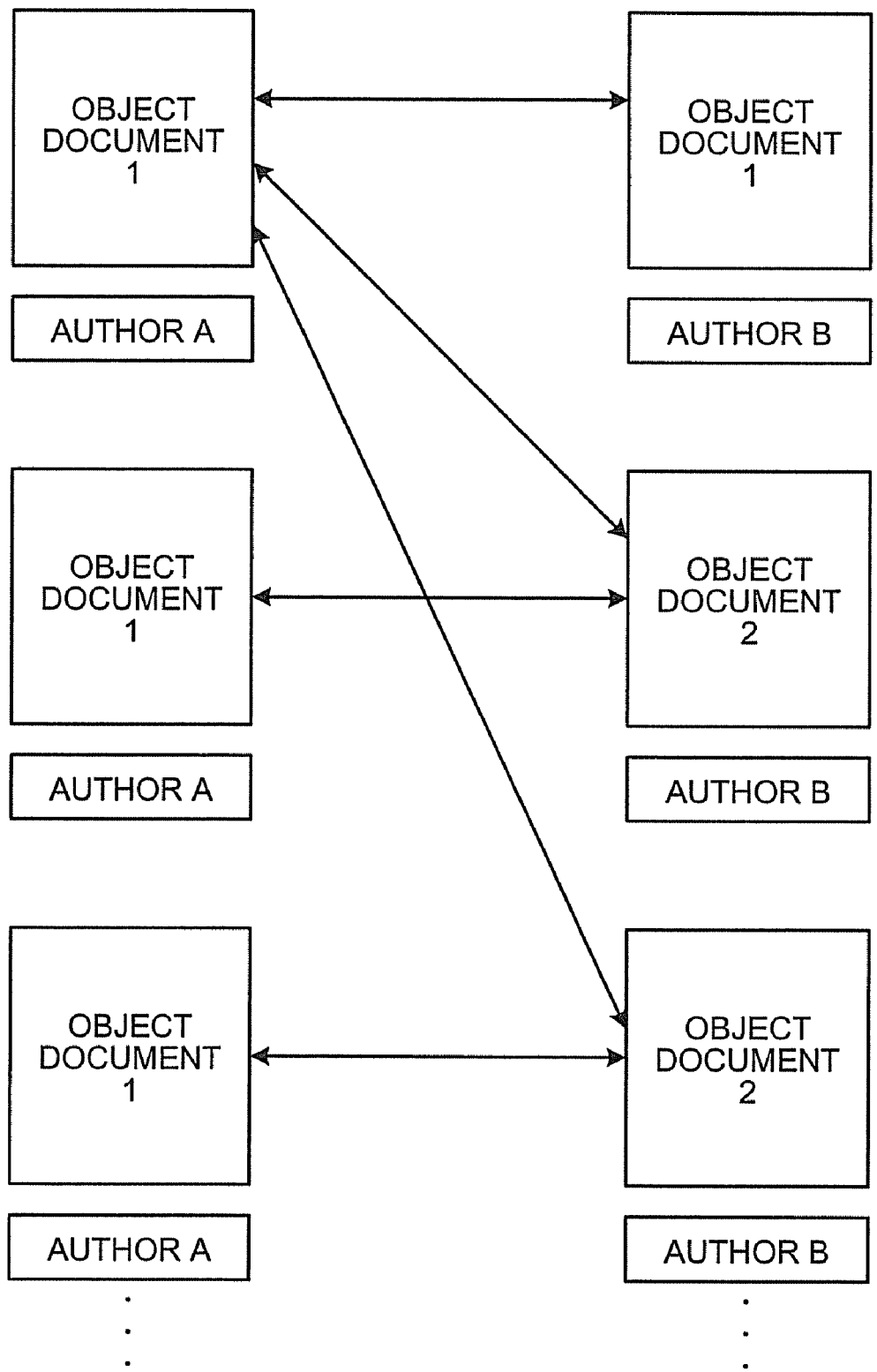
FIG. 13 is a diagram for explaining importance calculation processing.

For example, as shown in FIG. 13, it is assumed that an object document 1 created by an author A is associated with a plurality of object documents 2, an author of all the object documents 2 is B, and each of the object documents 2 is associated with a plurality of documents 1.

When structured documents of the two authors are linked to each other, it is anticipated that the authors have discussed the structured documents in depth. In other words, it is anticipated that importance of such structured documents created by the authors is high.

Thus, in this case, author information indicating the author A of the object documents 1 and the author B of the object documents 2 is registered in the history DB 132 in advance. When an author of an object document is the author A or the author B, importance, which is high compared with importance of the other object documents, is calculated for the object document. Consequently, it is possible to calculate importance, which is high compared with importance of the other object documents, for object documents created by authors of structured documents linked to each other.

As another example, it is assumed that comments from a plurality of authors are made with respect to one object document. In this case, importance, which is higher compared with importance of comments of other authors, may be calculated for comments of authors registered in the history DB 132 as described above.

The metadata analyzing unit 108 specifies the number of structured documents, the number of related documents associated with which in metadata is equal to or larger than the defined number set in advance and which are written by an identical author. When the number of structured documents specified is equal to or larger than the defined number set in advance, the metadata analyzing unit 108 registers author information of the structured documents in the history DB 132.

The structured documents of the author registered in the history DB 132 are often referred to and are considered to be important. Thus, the importance calculating unit 120 calculates importance, which is high compared with importance of object documents of authors other than the author indicated in the author information, for an object document of the author indicated in the author information registered in the history DB 132. Consequently, it is possible to calculate higher importance for an object of an author who often expresses opinions concerning predetermined content.

The metadata analyzing unit 108 retrieves structured documents, contents of which described in text are associated with an identical attribute in the ontology DB 130 and which are written by an identical author. When the number of structured documents, contents of which are associated with an identical attribute and which are written by an identical author, is equal to or larger than the defined number set in advance, the metadata analyzing unit 108 registers author information of the structured documents in the history DB 132 in association with the attribute.

The author registered in the history DB 132 is considered to be a person who has a good knowledge of content concerning a predetermined attribute. Thus, the importance calculating unit 120 calculates importance, which is high compared with importance of object documents of authors other than the author, for an object document that is written by the author indicated in the author information associated with the predetermined attribute in the history DB 132 and has an attribute corresponding to the predetermined attribute. Consequently, it is possible to calculate higher importance for an object document of an author who often expresses opinions concerning content corresponding to the predetermined attribute.

The metadata analyzing unit 108 specifies, based on metadata appended to contents, structured documents, in metadata of which data indicating a link relation with the other structured documents is not included and which are written by an identical author. When the number of structured documents specified is equal to or larger than the defined number set in advance, the metadata analyzing unit 108 registers author information of the structured documents in the history DB 132.

The importance calculating unit 120 calculates importance, which is low compared with importance of object documents of authors other than the author indicated in the author information, for the object document of the author indicated in the author information registered in the history DB 132. Consequently, it is possible to eliminate spam.

As another example, importance, which is low compared with importance of comments of the other authors, may be calculated for a comment by the author indicated in the author information registered in the history DB 132.

The text-information extracting unit 110 specifies whether, in text of a related document associated with an object document, a description supporting the object document is included. The text-information extracting unit 110 specifies whether a description is the description supporting the object document by extracting affirmative expression and negative expression in text. The importance calculating unit 120 calculates importance, which is high compared with importance of object documents corresponding to related documents not including the description that supports the object documents, for an object document associated with the related document including the description supporting the object document.

Moreover, when a plurality of related documents are associated with an object document, the importance calculating unit 120 calculates importance based on whether a description supporting the object document is included in text of each of the related documents. Specifically, the importance calculating unit 120 calculates importance, which is high compared with importance of an object document, the number of related documents including a description supporting which is smaller than the defined number set in advance, for an object document, the number of related documents including a description supporting which is equal to or larger than the defined number.

As another example, the importance calculating unit 120 may calculate higher importance as the number of related documents including a description supporting an object document is larger.

The importance calculating unit 120 calculates importance based on a plurality of comments on text of a structured document. Specifically, when a percentage of an identical opinion in the comments on the text is equal to or larger than a predetermined percentage, the importance calculating unit 120 calculates importance, which is high compared with importance of the identical opinion, for an opinion opposite to the opinion. This is because such an opinion is content that should be paid attention compared with the other opinions.

Figure 14:
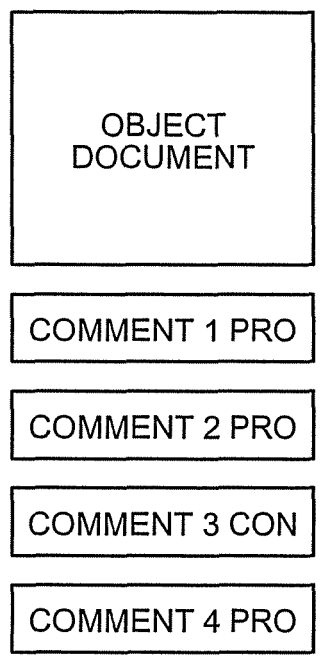
FIG. 14 is a diagram for explaining importance calculation processing.

In the example shown in FIG. 14, an opinion objecting to an object document is described only in a comment 3 among a plurality of comments on the object document. Therefore, in this case, the importance calculating unit 120 calculates importance, which is high compared with importance of the other comments, for the comment 3 compared.

Figure 15:
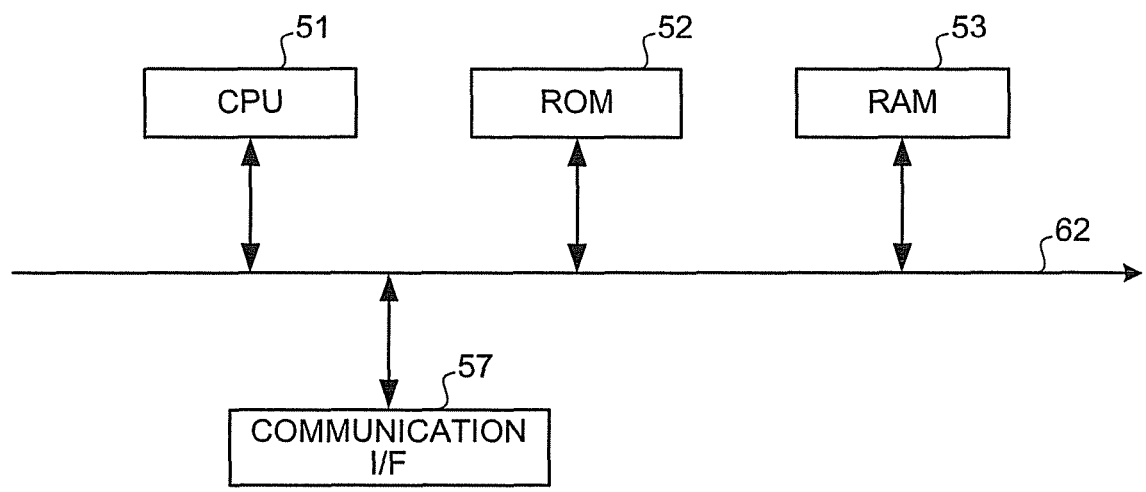
FIG. 15 is a diagram of a hardware configuration of the structured-document extracting apparatus.

As shown in FIG. 15, the structured-document extracting apparatus 10 includes, as a hardware configuration, a ROM 52 in which a structured-document extraction program for executing the structured-document extraction processing in the structured-document extracting apparatus 10 and the like are stored, a CPU 51 that controls respective units of the structured-document extracting apparatus 10 according to the programs in the ROM 52, a RAM 53 that stores various data necessary for control of the structured-document extracting apparatus 10, a communication interface (I/F) 57 that makes connection to a network and performs communication, and a bus 62 that connects the respective units.

The structured-document extraction program in the structured-document extracting apparatus 10 described above may be recorded in a recording medium readable by a computer such as a compact disc-read only memory (CD-ROM), a floppy (registered trademark) disk (FD), or a digital versatile disk (DVD) as a file of an installable format or an executable format and provided.

In this case, the structured-document extraction program is read out from the recording medium and executed in the structured-document extracting apparatus 10 to be loaded onto a main storage. The respective units explained concerning the software configuration are generated on the main storage.

The structured-document extraction program according to this embodiment may be stored on a computer connected to a network such as the Internet and downloaded through the network to be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for retrieving a structured document comprising:
   a processor that is programmed to retrieve the structured document, wherein the processor causes:
   a first specifying unit to specify a plurality of object documents from a plurality of structured documents being accessible via a network, the object document being the structured document according to retrieval condition,
   a first extracting unit to extract a text included in the object document,
   a second extracting unit to extract a metadata appended to the object document, the metadata being first data indicating the text of the object document and second data indicating a link relation between the object document and related documents, each of the related documents being the structured document associated with the object document,
   a second specifying unit to specify whether a description supporting the object document is included in the text of the each related document,
   an analyzing unit to analyze whether author information of a related document is included in a metadata appended to the related document based on the metadata appended to the object document, and
   a first calculating unit to calculate higher importance for the object document related to the related document having the author information thereof included in the metadata compared with important of the object document related to the related document not having the author information thereof included in the metadata; and further to calculate higher importance for the object document corresponding to the related document including the description supporting the object document compared with importance of the object document corresponding to the related document not including a description supporting the object document.

2. The apparatus according to claim 1, wherein the second data indicates a track-back.

3. The apparatus according to claim 1, wherein the metadata includes, as first data indicates content of a site or an article of the structured document.

4. The apparatus according to claim 1, wherein the processor further causes:
   a third specifying unit to specify a date of creation of a related document included in a metadata appended to the related document wherein
   the second specifying unit specifies a data of creation of the object document included in the metadata appended to the object document, and
   the first calculating unit calculates importance of the object document based on duration between the date of creation of the object document and the date of creation of the related document.

5. The apparatus according to claim 4, wherein
   the third specifying unit specifies a date of creation of each related document, and
   the first calculating unit calculates higher importance for the object document for which number of the related documents created within a predetermined period from the creation date of the object document is equal to or larger than a defined number compared with importance of the object document for which the number of the related documents created within the predetermined period from the creation date of the object document lower than the defined number.

6. The apparatus according to claim 1, wherein the processor further causes a counting unit to count number of opinions on the text of the object document included in the metadata appended to the object document, the opinions being opinions of different authors, wherein the first calculating unit calculates importance of the object data based on the number of opinions counted by the counting unit.

7. The apparatus according to claim 1, wherein the second specifying unit specifies a date of writing of an opinion on the text of the object document included in the metadata, and the first calculating unit calculates importance of the object document based on the date of writing specified by the second specifying unit.

8. The apparatus according to claim 1, wherein the first calculating unit calculates lower importance for the object document not having information indicating a link relation with other structured document included in the metadata compared with importance of the object document having information indicating a link relation with other structured documents included in the metadata.

9. The apparatus according to claim 1, further comprising:

a storage unit that stores therein author information of a first author and a second author when, in the metadata of a first object document of the first author among the object documents, the first object document is associated with a plurality of second object documents of the second author among the object documents and, in the metadata of a second structured document, the second object document is associated with a plurality of first object documents, wherein the second specifying unit specifies author information indicating an author of the structured document from the metadata appended to the structured document, and the first calculating unit calculates higher importance for the object document of the author indicated in the author information stored in the storage unit compared with importance of the object document of an author other than the author indicated in the author information.

10. The apparatus according to claim 1, further comprising:

a storage unit that stores author information of an author of the structured documents when the number of the structured documents specified by the second specifying unit is equal to or larger than a defined number set in advance, wherein the second specifying unit specifies the number of structured documents, the number of related documents of which associated in the metadata is equal to or larger than a defined value set in advance, the structured documents being written by same author, and the first calculating unit calculates higher importance for the object document of the author indicated in the author information compared to importance of the object documents of authors other than the author indicated in the author information held by the storing unit.

11. The apparatus according to claim 1, further comprising:

a first storage unit that stores therein a plurality of contents related to each other in association with respective attributes; and a second storage unit that stores therein, when there are structured documents with content described in the text thereof being associated with an identical attribute in the first storage unit and the number of such structured documents written by same author is equal to or larger than a defined number set in advance, author information of the author of the structured documents in association with the attribute, wherein the processor further causes a retrieving unit to retrieve, based on the metadata, structured documents written by an identical author out of the structured documents, wherein the second specifying unit specifies content described in the text, and the first calculating unit calculates higher importance for the object document of the author associated with an attribute of a retrieval object in the second storage unit compared with importance of the object documents of authors other than the author indicated in the author information.

12. The apparatus according to claim 1, further comprising:

a storage unit that stores therein, when the number of structured documents specified by the second specifying unit is equal to or larger than a defined number set in advance, author information of the structured documents, wherein the second specifying unit specifies structured documents that do not include data indicating a link relation with other structured documents in the metadata appended to the structured document among the structured documents and are written by an identical author, and the first calculating unit calculates lower importance for the object documents of the author indicated in the author information held by the storage unit compared with importance of the object documents of authors other than the author indicated in the author information.

13. The apparatus according to claim 1, wherein the second specifying unit specifies a plurality of opinions on the text of the structured document from the metadata and specifies opinions with identical content and opinions with content opposite to the identical content out of specified opinions, and the processor further causes a second calculating unit to calculate higher importance, when a predetermined percentage of a plurality of opinions on the text of the object document include certain content, for opinions opposite to the certain content importance compared with importance of the certain content.

14. The apparatus according to claim 1, further comprising:

a storage unit that stores therein, when a first object document of a first author among the object documents is associated with a plurality of second object documents of a second author among the object documents in the metadata of the first object document and the second object documents is associated with a plurality of first object documents in the metadata of the second object document, the author information of the first author and the second author, wherein the second specifying unit specifies author information indicating an author of the structured document from the metadata, the processor further causes:

a third specifying unit to specify a plurality of opinions on the text of the object documents from the metadata and to specify authors of the respective opinions, and a second calculating unit that calculates higher importance for opinions of the authors corresponding to the author information held by the storage unit among the opinions included in the text of the object documents compared with importance of opinions of authors other than the authors corresponding to the author information.

15. The apparatus according to claim 1, further comprising:

a storage unit that stores therein, when data indicating a link relation with the other structured documents is not included in the metadata and the number of structured documents with identical author information is equal to or larger than a defined number set in advance, the author information, wherein the second specifying unit specifies author information indicating an author of the structured document from the metadata, and further specifies author information indicating an author who has written each of a plurality of opinions on the text from the metadata of the object document, and the processor further causes a second calculating unit to calculate lower importance for opinions of the authors indicated in the author information stored in the storage unit among the opinions on the text compared with importance of opinions of authors other than the authors indicated in the author information.

16. A method of retrieving a structured document that is accessible via a network, the method comprising:

specifying a plurality of object documents from a plurality of structured documents, the object document being the structured document according to retrieval condition, extracting a text included in the object document, extracting a metadata appended to the object document, the metadata being first data indicating the text of the object document and second data indicating a link relation between the object document and related documents, each of the related documents being the structured document associated with the object document, specifying whether a description supporting the object document is included in the text of the each related document, analyzing whether author information of a related document is included in a metadata appended to the related document based on the metadata appended to the object document, and calculating higher importance for the object document related to the related document having the author information thereof included in the metadata compared with importance of the object document related to the related document not having the author information thereof included in the metadata, and further calculating higher importance for the object document corresponding to the related document including the description supporting the object document compared with importance of the object document corresponding to the related document not including a description supporting the object document.

17. A computer program product that is executable by a computer and has a computer-readable recording medium including a plurality of commands for retrieving a structured document, wherein the commands cause the computer to execute:

specifying a plurality of object documents from a plurality of structured documents, the object document being the structured document according to retrieval condition, extracting a text included in the object document, extracting a metadata appended to the object document, the metadata being first data indicating the text of the object document and second data indicating a link relation between the object document and related documents, each of the related documents being the structured document associated with the object document, specifying whether a description supporting the object documents is included in the text of the each related document, analyzing whether author information of a related document is include in a metadata appended to the related document based on the metadata appended to the object document, and calculating higher importance for the object document related to the related document having the author information thereof included in the metadata compared with importance of the object document related to the related document not having the author information thereof included in the metadata, and further calculating higher importance for the object document corresponding to the related document including the description supporting the object document compared with importance of the object document corresponding to the related document not including a description supporting the object document.

18. The apparatus according claim 1, wherein the second specifying unit specifies, when a plurality of related documents are associated with the object document in the metadata, whether the description supporting the object document is included, on the basis of an affirmative expression included in the text of the each related document; and the first calculating unit calculates higher important for the object document for which the number of the related documents containing the description supporting the object document is equal to or larger than a defined number set compared with the object document for which the number of the related documents is less than the defined number set.

19. The apparatus according to claim 1, wherein the first calculating unit calculates higher importance for a second object document compared with importance of a first object document when, in the metadata of the first object document among the object documents, a plurality of structured documents including the second object document among the object documents are associated with the first object document, a plurality of structured documents are associated with the second object document in the metadata of the second object document, and the number of the structure documents associated with the second object document is large compared with the number of the structured documents associated with the first object document.

* * * * *